United States Patent [19]

Asai et al.

[11] Patent Number: 4,963,740
[45] Date of Patent: Oct. 16, 1990

[54] SUBTRACTION PROCESSING METHOD FOR RADIATION IMAGES OBTAINED UNDER DIFFERENT CONDITIONS

[75] Inventors: Eiichi Asai; Yoshiaki Yokoyama, both of Kanagawa, Japan

[73] Assignee: Fuji Photo Film Co., Ltd., Kanagawa, Japan

[21] Appl. No.: 321,123

[22] Filed: Mar. 9, 1989

[30] Foreign Application Priority Data

Mar. 14, 1988 [JP] Japan ................................ 63-59613

[51] Int. Cl.$^5$ ..................... G03C 5/15; G06F 15/68; G03B 42/00
[52] U.S. Cl. .............................. 250/327.2; 250/484.1
[58] Field of Search ..................... 250/327.2, 484.1; 378/99, 62, 176

[56] References Cited

U.S. PATENT DOCUMENTS

| | | | |
|---|---|---|---|
| 4,258,264 | 3/1981 | Kotera et al. | 250/484.1 |
| 4,276,473 | 6/1981 | Kato et al. | 250/327.2 |
| 4,315,318 | 2/1982 | Kato et al. | 382/6 |
| 4,346,295 | 8/1982 | Tanaka et al. | 250/327.2 |
| 4,387,428 | 6/1983 | Ishida et al. | 364/413.13 |
| 4,527,060 | 7/1985 | Suzuki et al. | 250/327.2 |
| 4,590,517 | 5/1986 | Kato et al. | 358/111 |
| 4,620,097 | 10/1986 | Tanaka et al. | 250/327.2 |
| 4,761,739 | 8/1988 | Shimura | 364/414 |
| 4,831,256 | 5/1989 | Tanaka et al. | 250/327.2 |
| 4,861,993 | 8/1989 | Adachi et al. | 250/327.2 |

FOREIGN PATENT DOCUMENTS 56-11395  2/1981  Japan ................................ 250/327.2

Primary Examiner—Constantine Hannaher
Assistant Examiner—Edward J. Glick
Attorney, Agent, or Firm—Sughrue, Mion, Zinn, Macpeak & Seas

[57] ABSTRACT

A subtraction processing method for radiation images comprises the steps of obtaining a masked image signal by reading out a masked image of an object recorded without injection of contrast media into a specific structure of the object, and obtaining a live image signal by reading out a live image recorded after contrast media have been injected into the specific structure of the object. The parts of the masked image signal and the live image signal corresponding to the same picture elements in the masked and live images are subtracted, thereby obtaining a difference signal for forming an image of the specific structure. In cases where different read-out conditions are used when obtaining the masked image signal and the live image signal, one of the masked image signal or the live image signal is converted into the image signal which would have been obtained if the same read-out conditions had been used for both images. Subtraction processing is then carried out after one of the image signals has been converted.

4 Claims, 2 Drawing Sheets

SUBTRACTION PROCESSING METHOD FOR RADIATION IMAGES OBTAINED UNDER DIFFERENT CONDITIONS

BACKGROUND OF THE INVENTION

1. Field of the Invention

This invention relates to a subtraction processing method used when reproducing radiation images. This invention particularly relates to a so-called temporal (time difference) subtraction processing method used when reproducing radiation images wherein the image of a specific structure or part of an object is extracted from the image of the whole object by subtracting the image signal of a radiation image of the whole object obtained without injection of contrast media from the image signal of a radiation image in which the image of the specific structure of the object is enhanced by the injection of contrast media.

2. Description of the Prior Art

Carrying out subtraction processing on radiation images has heretofore been known. When performing subtraction processing, two radiation images recorded under different conditions are photoelectrically read out and digital image signals are obtained which represent the radiation images. The parts of the image signals which represent corresponding picture elements in the radiation images are then subtracted from each other, thereby to obtain a difference signal representing an image of a specific structure or part of the object represented by the radiation images. With the subtraction processing method a difference signal is obtained by subtracting two digital image signals from each other, and from the difference signal, the radiation image of a specific structure can be reproduced.

As one of the subtraction processing methods, the so-called temporal (time difference) subtraction processing method has heretofore been known. In the temporal subtraction processing method, the image of a specific structure in an object is extracted from the image of the whole object by subtracting the image signal representing a radiation image (a masked image) of an object obtained without injection of contrast media from the image signal representing a radiation image (a live image) in which the image of the specific structure in the object is enhanced by the injection of contrast media.

The image signals used and on which subtraction processing is carried out may be obtained by photoelectrically reading out radiation images recorded on, for example, X-ray photographic film. On the other hand, as disclosed in U.S. Pat. Nos. 4,258,264, 4,276,473, 4,315,318 and 4,387,428 and Japanese Unexamined Patent Publication No. 56(1981)-11395, it has been proposed to use a stimulable phosphor sheet in radiation image recording and reproducing systems. With the proposed radiation image recording and reproducing systems, an image signal representing a radiation image can be obtained directly, and processing, such as the developing of film, is not required. Therefore, it is advantageous for the radiation images on which subtraction processing is to be carried out, i.e. a masked image and a live image, to be recorded and read out by using one of the above proposed radiation image recording and reproducing systems.

Specifically, when certain kinds of phosphors are exposed to radiation such as X-rays, α-rays, β-rays, γ-rays, cathode rays or ultraviolet rays, they store part of the energy of the radiation. Then, when the phosphor which has been exposed to the radiation is exposed to stimulating rays such as visible light, light is emitted by the phosphor in proportion to the amount of energy stored during exposure to the radiation. A phosphor exhibiting such properties is referred to as a stimulable phosphor.

In the aforesaid radiation image recording and reproducing systems, a sheet provided with a layer of the stimulable phosphor (hereinafter referred to as a stimulable phosphor sheet) is first exposed to radiation, which has passed through an object such as the human body, in order to store a radiation image of the object thereon, and is then scanned with stimulating rays which cause it to emit light in proportion to the amount of energy stored during exposure to radiation. The light emitted by the stimulable phosphor sheet upon stimulation thereof is photoelectrically detected and converted into an electric image signal.

In general, when radiation images (a masked image and a live image), each stored on a stimulable phosphor sheet, are read out in the course of carrying out a temporal subtraction processing method, it is required that read-out conditions such as read-out gains and scale factors for both the masked image and the live image be adjusted so that they are equal to each other. Otherwise, part of the image of an object which does not belong to the specific structure of an object to be extracted remains unremoved when an image is reproduced from the difference signal obtained by carrying out the subtraction processing method.

However, it is often desired to view the masked image and the live image themselves. In such cases, it is desired that the read-out conditions for the masked image and those for the live image be adjusted to values appropriate for each image, which values may be different from each other. This requirement is incompatible with the requirement to make the read-out conditions for the image signals equal when carrying out subtraction processing.

The same problems arise also when image signals are obtained by reading out radiation images recorded on X-ray photographic film.

SUMMARY OF THE INVENTION

The primary object of the present invention is to provide a subtraction processing method used when reproducing radiation images wherein a difference signal substantially representing an image of a specific structure alone, which is part of an object and extracted from the whole image of an object, can be obtained when the read-out conditions used for reading out a masked image and those used for reading out a live image are different from each other.

Another object of the present invention is to provide a subtraction processing method used when reproducing radiation images which enables the reproduction of a masked image and/or a live image having an image quality suitable for viewing purposes.

The present invention provides a subtraction processing method used when reproducing radiation images, which comprises the steps of:

(i) obtaining a masked image signal by reading out a radiation image of an object, which radiation image acts as a masked image and has been recorded without the injection of contrast media into a specific structure of said object, (ii) obtaining a live image signal by reading out a radiation image of said object, which radiation image acts as a live image and has been recorded after contrast media have been injected into said specific structure of said object, and (iii) subtracting the parts of said masked image signal and said live image signal from each other which represent corresponding picture elements in said masked image and said live image, thereby obtaining a difference signal from which an image of said specific structure can be formed, wherein the improvement comprises the steps of:

(a) in cases where read-out conditions used for obtaining said masked image signal and those used for obtaining said live image signal are different from each other, carrying out conversion processing on one of said masked image signal or said live image signal so that the image signal is converted into the image signal which would have been obtained if the read-out conditions used to obtain both image signals were equal, and (b) carrying out subtraction processing on the image signal obtained by conversion processing and said other image signal.

With the subtraction processing method used when reproducing radiation images in accordance with the present invention, one of the masked image signal or the live image signal, each obtained under different read-out conditions, is subjected to conversion processing so that it becomes equivalent to the image signal which would have been obtained if the read-out conditions used to obtain both image signals were equal. Thereafter, subtraction processing is carried out on the image signal obtained by conversion processing and said other image signal. Therefore, it is possible to obtain a subtraction image, i.e. an image obtained after subtraction processing has been carried out, which substantially represents only the specific structure injected with contrast media. Accordingly, with the subtraction processing method used when reproducing radiation images in accordance with the present invention, when the masked image and the live image are read out, the conditions under which the images are read out can be adjusted so as to be suitable for each image. As a result, the masked image and/or the live image can be reproduced into a visible image having an image quality suitable for viewing, particularly for diagnostic purposes, and can be utilized for making medical diagnoses or the like.

Also, with the subtraction processing method used when reproducing radiation images in accordance with the present invention, the read-out conditions for the masked image and those for the live image need not be equal to each other. Therefore, it is not necessary that recording media, such as stimulable phosphor sheets, on which the masked image and the live image are recorded, be subjected almost simultaneously to a read-out process. Accordingly, the degree of freedom with which the readout process may be conducted is increased.

DESCRIPTION OF THE PREFERRED EMBODIMENTS

The present invention will hereinbelow be described in further detail with reference to the accompanying drawings.

Figure 1:
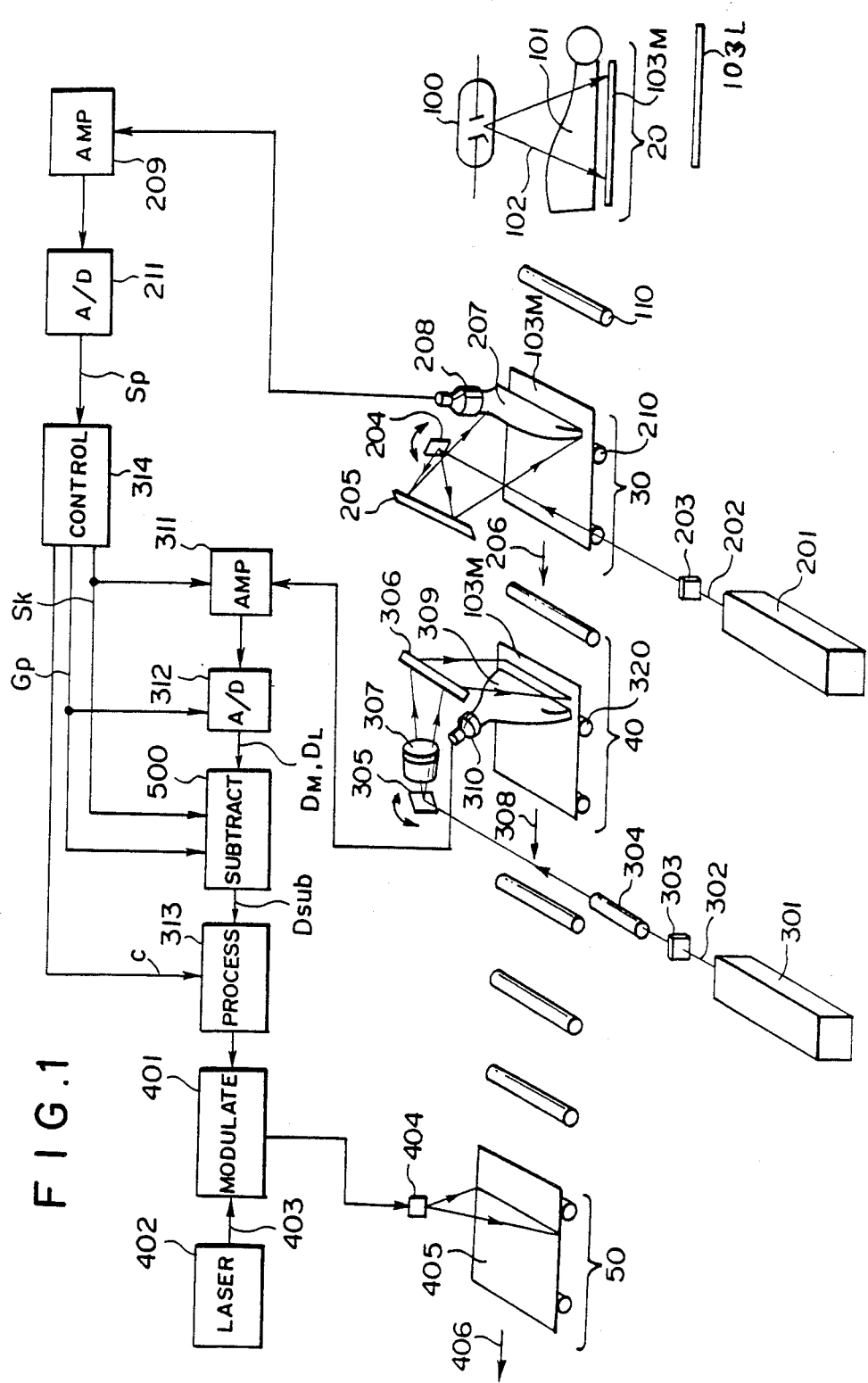
FIG. 1 is a schematic view showing a radiation image recording and reproducing system wherein an embodiment of the subtraction processing method for radiation images in accordance with the present invention is employed.

With reference to FIG. 1, a radiation image recording and reproducing system comprises basically a radiation image recording section 20, a preliminary read-out section 30, a final read-out section 40, and an image reproducing section 50. At the radiation image recording section 20, radiation 102 is irradiated by a radiation source 100, which may be constituted of an X-ray tube or the like, toward an object 101 (a person in this case). At first, the object 101 is not injected with contrast media. A stimulable phosphor sheet 103M for storing radiation energy thereon is placed at a position at which it is exposed to the radiation 102 which has passed through the object 101, and a radiation image (a masked image) of the object 101 is stored on the stimulable phosphor sheet 103M.

The stimulable phosphor sheet 103M carrying the radiation image of the object 101 stored thereon is sent to the preliminary read-out section 30 by a sheet conveyance means 110 constituted of a conveyor roller or the like. At the preliminary read-out section 30, a laser beam 202 emanated by a laser beam source 201 first passes through a filter 203 for filtering out light having a wavelength within the range of wavelengths of the light emitted by the stimulable phosphor sheet 103M upon stimulation thereof by the laser beam 202. Then, the laser beam 202 is deflected in one dimension by a light deflector 204, which may be a galvanometer mirror or the like, and directed onto the stimulable phosphor sheet 103M by a plane reflection mirror 205. The laser beam source 201 is selected so that the laser beam 202 emanating therefrom has a wavelength distribution different from and far apart from the wavelength distribution of the light emitted by the stimulable phosphor sheet 103M upon stimulation thereof. While the laser beam 202 impinges upon the stimulable phosphor sheet 103M, the stimulable phosphor sheet 103M is moved in the direction indicated by the arrow 206 (i.e. in the sub-scanning direction) by a sheet conveyance means 210 constituted of conveyor rollers or the like, and thus the overall surface of the stimulable phosphor sheet 103M is exposed to and scanned by the laser beam 202. The power of the laser beam source 201, the beam diameter of the laser beam 202, the scanning speed of the laser beam 202, and the speed with which the stimulable phosphor sheet 103M moves are selected so that the level of the stimulation energy of the laser beam 202 used when carrying out a preliminary read-out is lower than the level of the stimulation energy of the laser beam used when carrying out a final read-out in the final read-out section 40.

When exposed to the laser beam 202 as described above, the stimulable phosphor sheet 103M emits light with an intensity that is proportional to the amount of energy stored thereon when it was exposed to radiation, and the light which is emitted enters a light guide member 207 which may be of the shape and material disclosed in U.S. Pat. No. 4,346,295. The light is guided inside of the light guide member 207 through repeated total reflection, emanates from a light output face of the light guide member 207 and is received by a photodetector 208 constituted of a photomultiplier or the like. The light receiving face of the photodetector 208 is positioned so that it is in close contact with a filter so that only light within the wavelength distribution range of the light emitted by the stimulable phosphor sheet 103M is transmitted and light within the wavelength distribution range of the stimulating rays is filtered out. Therefore, the photodetector 208 detects only the light emitted by the stimulable phosphor sheet 103M upon stimulation thereof. The light detected by the photodetector 208 is converted into an electric signal carrying the image input information which is stored on the stimulable phosphor sheet 103M, and amplified by an amplifier 209. The signal generated by the amplifier 209 is digitized by an A/D converter 211, and sent as a preliminary read-out image signal Sp to a final read-out control circuit 314 in the final read-out section 40. On the basis of the image input information which the preliminary read-out image signal Sp represents, the final read-out control circuit 314 calculates a read-out gain setting value Sk, a scale factor setting value Gp, and an image processing condition setting value (c) by performing a histogram analysis or the like.

After the preliminary read-out is finished, the stimulable phosphor sheet 103M is sent to the final read-out section 40. In this section, a laser beam 302 emanating from by a laser beam source 301 first passes through a filter 303 which filters out light having a wavelength within the range of wavelengths of the light emitted by the stimulable phosphor sheet 103M upon stimulation thereof by the laser beam 302. Then, the beam diameter of the laser beam 302 is precisely adjusted by a beam expander 304. The laser beam 302 is then deflected by a light deflector 305 formed of a galvanometer mirror or the like, and is made to impinge upon the stimulable phosphor sheet 103M by a plane reflection mirror 306. Between the light deflector 305 and the plane reflection mirror 306 an fθ lens 307 is disposed, which lens keeps the beam diameter of the laser beam 302 uniform while it scans the stimulable phosphor sheet 103M. While the laser beam 302 is impinging upon the stimulable phosphor sheet 103M, the stimulable phosphor sheet 103M is moved in the direction indicated by the arrow 308 (i.e. in the sub-scanning direction) by a sheet conveyance means 320 constituted of conveyor rollers or the like and, consequently, the overall area of the stimulable phosphor sheet 103M is exposed to and scanned by the laser beam 302. Upon exposure to the laser beam 302, the stimulable phosphor sheet 103M emits light in proportion to the amount of energy stored thereon during exposure to the radiation, and the light which is emitted enters a light guide member 309 which is made of the same material and has the same configuration as the light guide member 207 used for the preliminary read-out. The light emitted by the stimulable phosphor sheet 103M is guided inside of the light guide member 309 through repeated total reflection, emanates from the light output face of the light guide member 309 and is received by a photodetector 310 constituted of a photomultiplier or the like. The light receiving face of the photodetector 310 is positioned so that it is in close contact with a filter. The filter selectively transmits only light within the wavelength distribution range of the light emitted by the stimulable phosphor sheet 103M, so that the photodetector 310 will detect only the light emitted by the phosphor sheet 103M.

Figure 3:
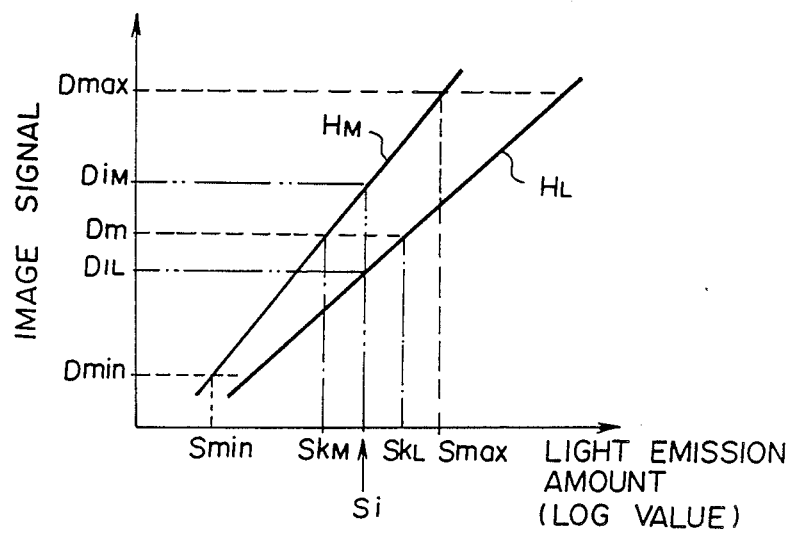
FIG. 3 is an explanatory graph showing the relationship between a masked image signal and a live image signal read out under different conditions, which signals are subjected to the subtraction processing method used when reproducing radiation images in accordance with the present invention.

The output of the photodetector 310, which photodetector 310 detected only light representing the radiation image stored on the stimulable phosphor sheet 103M, is amplified to an appropriate level by an amplifier 311, the read-out gain of which has been adjusted to a value equal to the read-out gain setting value of the masked image SkM calculated by the control circuit 314. The amplified electric signal is fed into an A/D converter 312 which converts the electric signal into a digital signal (a masked image signal) DM by use of a scale factor which has been selected on the basis of the scale factor setting value of the masked image GpM to suit the width of the signal fluctuation. The masked image signal DM thus obtained is fed into a subtraction operating section 500. As shown in FIG. 3, when the values of the digital masked image signal are plotted against the logarithmic values of the light emission amounts (the intensity of the emitted light) and the maximum and minimum values of the light emission amounts are Smax and Smin, respectively, the line HM represents the values of the digital masked image signal, which has been read out under appropriate readout conditions. The slope of the line HM corresponds to the scale factor GpM, and the read-out gain Sk is the factor by which SkM is multiplied to obtain Dm, the middle value of the digital masked image signal.

After the radiation image (the masked image) of the object 101 has been stored on the stimulable phosphor sheet 103M at the radiation image recording section 20, contrast media are injected into a specific structure (for example, a blood vessel) of the object 101. At the radiation image recording section 20, a radiation image (a live image) of the object 101 is stored on a stimulable phosphor sheet 103L in the same manner as described above. In the course of recording the masked image and the live image, the tube voltage of the radiation source 100 is kept constant, and the relationship between the position of the object 101 and the position of the stimulable phosphor sheet 103L is made identical to the relationship between the position of the object 101 and the position of the stimulable phosphor sheet 103M when the masked image was recorded, so that there is no difference between the image recording processes for the masked image and the live image, except for the presence or absence of the contrast media.

After the live image of the object 101 has been stored on the stimulable phosphor sheet 103L, the stimulable phosphor sheet 103L is sent to the preliminary read-out section 30 and then to the final read-out section 40. The live image is read out from the stimulable phosphor sheet 103L in the same manner as the masked image was read out from the stimulable phosphor sheet 103M. The read-out image signal (a live image signal) DL is detected from the intensity of light emitted from the stimulable phosphor sheet 103L and is fed into the subtraction operating section 500. As described above, the masked image and the live image of the object 101 which are stored respectively on the stimulable phosphor sheet 103M and the stimulable phosphor sheet 103L are different from each other in the presence or absence of the contrast media. Therefore, when the control circuit 314 adjusts the read-out gains Sk to suit the image input information on the stimulable phosphor sheet 103M and the image input information on the stimulable phosphor sheet 103L, the read-out gains Sk are set at different values. This also applies to the scale factors Gp.

Figure 2:
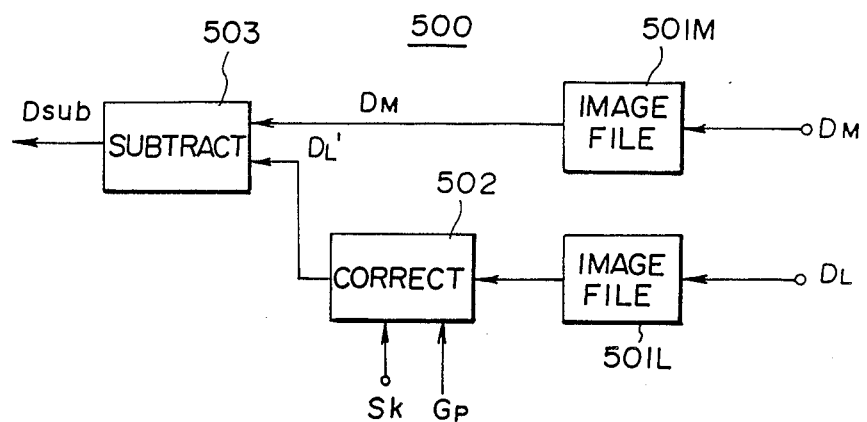
FIG. 2 is a block diagram showing the configuration of a subtraction operating section in the radiation image recording and reproducing system shown in FIG. 1.

Subtraction processing will be described hereinbelow with reference to FIG. 2 which shows the subtraction operating section 500 in detail. The masked image signal DM and the live image signal DL are stored respectively in image files 501M and 501L of the subtraction operating section 500. In this embodiment, the density scale has 10 bits (1,024 values), and each of the picture elements represented by the masked image signal DM and the live image signal DL has a value ranging from 0 to 1,023. When subtraction processing is to be carried out, the masked image signal DM and the live image signal DL are read from the image files 501M and 501L. The masked image signal DM is fed directly into a subtraction operating circuit 503, and the live image signal DL is fed into the subtraction operating circuit 503 after being processed in a correction circuit 502. The correction circuit 502 stores the read-out gain setting value SkM and the scale factor setting value GpM used when reading out the masked image signal, both of which values are received from the control circuit 314, and the read-out gain setting value of the live image SkL and the scale factor setting value of the live image GpL used when reading out the live image signal, which are also received from the control circuit 314. Upon receiving the live image signal DL, the correction circuit 502 converts it into a signal DL' expressed as $$DL' = \frac{GpM}{GpL}(DL - 511) + 511 + (SkL - SkM)GpM \quad (1)$$

The subtraction operating circuit 503 receives the signal DL', obtained after the live image signal DL has undergone conversion processing, and the masked image signal DM, and carries out a subtraction processing operation expressed as $$Dsub = DM - DL'$$

where the subtraction is carried out at parts of the digital signals corresponding to the same picture elements in the images recorded on the stimulable phosphor sheets. The difference signal Dsub thus obtained is fed into an image processing circuit 313 which carries out image processing, such as gradation processing and frequency response processing, on the difference signal Dsub. After being processed the difference signal Dsub is fed into the image reproducing section 50. How the image is processed is based on the value of the image processing condition setting value (c), which was selected by the control circuit 314.

The difference signal Dsub is fed into a light modulator 401 at the image reproducing section 50. At the image reproducing section 50, a laser beam 403 emanating from a reproducing laser beam source 402 is modulated by the light modulator 401 in accordance with the difference signal Dsub received from the signal processing circuit 313, and is made to impinge upon a photosensitive material 405 such as photographic film by a scanning mirror 404 which causes the laser beam 403 to scan the photosensitive material 405. At this time, the photosensitive material 405 is moved in a direction normal to the aforesaid scanning direction, i.e. in the direction indicated by the arrow 406. Accordingly, the radiation image which the difference signal Dsub represents is recorded on the photosensitive material 405. It is possible to use any other appropriate method, such as displaying the image on a CRT, when reproducing the radiation image.

The radiation image reproduced on the photosensitive material 405 by use of the difference signal Dsub is an image of the specific structure of the object 101 into which the contrast media were injected. Also, in the aforesaid embodiment, subtraction processing is carried out between the live image signal DL' obtained from the aforesaid conversion processing operation and the masked image signal DM. Therefore, even though the stimulable phosphor sheet 103M and the stimulable phosphor sheet 103L are read-out under different conditions, it is possible to obtain a subtraction image which substantially represents only the specific structure injected with contrast media. This effect will hereinbelow be described in detail with reference to FIG. 3.

Consider the logarithmic value of a certain light emission amount Si (a certain intensity of emitted light), emitted from the stimulable phosphor sheet 103M during image read-out. The light emission amount Si is converted into a digital signal value DiM. On the other hand, during image read-out from the stimulable phosphor sheet 103L, a light emission amount Si is converted into a digital signal value DiL. The relationships between the image signal values DiM, DiL and the middle value Dm (=511) of the range from the minimum signal value Dmin (=0) to the maximum signal value Dmax (=1,023) are expressed as $$DiM = 511 + (Si - SkM)\,GpM \quad (2)$$

$$DiL = 511 + (Si - SkL)\,GpL \quad (3)$$

Formula (3) can be rewritten as $$Si = (DiL - 511)/GpL + SkL.$$

Substituting this formula into Formula (2) yields $$DiM = 511 + \left(\frac{DiL - 511}{GpL} + SkL - SkM\right)GpM$$

$$= \frac{GpM}{GpL}(DL - 511) + 511 + (SkL - SkM)GpM$$

The formula obtained is equal to the right side of Formula (1). Specifically, in cases where the live image signal DL is converted into the signal DL' as expressed by Formula (1), the signal DL' is equal to the digital signal value which would have been obtained if the light emission amounts, which were detected to generate the live image signal DL, had been read out under the same conditions (with the same read-out gain SkM and the same scale factor GpM) as the light emission amounts, which were detected to generate the masked image. Therefore, when subtraction processing is carried out according to the formula $$Dsub = DM - DL'$$

the difference signal Dsub is equivalent to the signal which would have been obtained if subtraction processing had been carried out on the masked image signal and the live image signal read out under the same read-out conditions. Accordingly, when the subtraction image is reproduced by use of the difference signal Dsub, only the image of the specific structure injected with the contrast media is formed.

The masked image signal DM and the live image signal DL stored in the image files 501M and 501L in the subtraction operating section 500 may also be sent directly to the image reproducing section 50 and used to reproduce a masked image and a live image. The masked image signal DM and the live image signal DL were detected by using read-out conditions adjusted to appropriate values on the basis of the image input information on the stimulable phosphor sheet 103M and the image input information on the stimulable phosphor sheet 103L. Therefore, in this case, the masked image and the live image can be reproduced with a good image quality, allowing the images to be used to make efficient and accurate diagnoses of illnesses.

In the aforesaid embodiment, instead of carrying out conversion processing on the live image signal DL, it may be carried out on the masked image signal DM. The masked image signal DM is then converted into the signal which would have been obtained if it had been read-out under the same conditions as the live image signal DL.

The aforesaid embodiment is applied to a radiation image recording and reproducing system wherein a stimulable phosphor sheet is utilized. However, the subtraction processing method used when reproducing radiation images in accordance with the present invention is also applicable to cases where radiation images in the form of a masked image and a live image are recorded or reproduced on, for example, X-ray photographic film, and the images are photoelectrically read out to obtain image signals, and the image signals are subjected to subtraction processing.

We claim:

1. A subtraction processing method used when reproducing radiation images, which comprises the steps of:
    (i) obtaining a masked image signal by reading out a radiation image of an object, which radiation image acts as a masked image and has been recorded without the injection of contrast media into a specific structure of said object,
    (ii) obtaining a live image signal by reading out a radiation image of said object, which radiation image acts as a live image and has been recorded after contrast media have been injected into said specific structure of said object, and
    (iii) subtracting the parts of said masked image signal and said live image signal from each other which represent corresponding picture elements in said masked image and said live image, thereby obtaining a difference signal from which an image of said specific structure can be formed,
    wherein the improvement comprises the steps of:
    (a) in cases where read-out conditions used for obtaining said masked image signal and those used for obtaining said live image signal are different from each other, carrying out conversion processing on one of said masked image signal or said live image signal so that the image signal is converted into the image signal which would have been obtained if the read-out conditions used to obtain both image signals were equal, and
    (b) carrying out subtraction processing on the image signal obtained by conversion processing and said other image signal.

2. A method as defined in claim 1 wherein said conversion processing converts said live image signal into a signal DL' expressed as $$DL' = \frac{GpM}{GpL}(DL - Dm) + Dm + (SkL - SkM)GpM$$

where DL denotes said live image signal, SkM denotes a read-out gain used when obtaining said masked image signal, SkL denotes a read-out gain used when obtaining said live image signal, GpM denotes a scale factor used when obtaining said masked image signal, GpL denotes a scale factor used when obtaining said live image signal, and Dm denotes a common middle value of said masked image signal and said live image signal.

3. A method as defined in claim 1 wherein said masked image signal and said live image signal are each obtained by reading out a radiation image stored on a stimulable phosphor sheet by two-dimensionally scanning said stimulable phosphor sheet with stimulating rays which cause said stimulable phosphor sheet to emit light in proportion to the amount of energy stored during exposure to radiation, and photoelectrically detecting the emitted light.

4. A method as defined in claim 2 wherein said masked image signal and said live image signal are each obtained by reading out a radiation image stored on a stimulable phosphor sheet by two-dimensionally scanning said stimulable phosphor sheet with stimulating rays which cause said stimulable phosphor sheet to emit light in proportion to the amount of energy stored during exposure to radiation, and photoelectrically detecting the emitted light.

* * * * *